(12) United States Patent
Polk et al.

(10) Patent No.: US 10,717,685 B1
(45) Date of Patent: Jul. 21, 2020

(54) PYROTECHNIC SMOKE OBSCURANTS CONTAINING METAL-ORGANIC FRAMEWORKS AND COMPOSITES THEREOF

(71) Applicant: Combat Capabilities Development Command, Chemical Biological Center, APG, MD (US)

(72) Inventors: Amee L Polk, Havre de Grace, MD (US); Zachary B Zander, Havre de Grace, MD (US); Danielle L Kuhn, Abingdon, MD (US); Gregory W Peterson, Bel Air, MD (US); Jared B DeCoste, Bel Air, MD (US)

(73) Assignee: The United States of America as Represented by the Secretary Of the Army, Washington, DC (US)

( * ) Notice: Subject to any disclaimer, the term of this patent is extended or adjusted under 35 U.S.C. 154(b) by 0 days.

(21) Appl. No.: 16/387,733

(22) Filed: Apr. 18, 2019

Related U.S. Application Data

(60) Provisional application No. 62/660,609, filed on Apr. 20, 2018.

(51) Int. Cl.
*C06D 7/00* (2006.01)
*C06D 3/00* (2006.01)
*C06B 33/02* (2006.01)
*C06B 25/18* (2006.01)
*C07F 7/00* (2006.01)
*C07F 3/06* (2006.01)
*C07F 7/28* (2006.01)
(Continued)

(52) U.S. Cl.
CPC ............... *C06D 7/00* (2013.01); *C06B 23/04* (2013.01); *C06B 25/18* (2013.01); *C06B 29/02* (2013.01); *C06B 29/22* (2013.01); *C06B 33/02* (2013.01); *C06D 3/00* (2013.01); *C07F 1/08* (2013.01); *C07F 3/06* (2013.01); *C07F 7/003* (2013.01); *C07F 7/28* (2013.01); *F42B 12/48* (2013.01)

(58) Field of Classification Search
CPC ........ C06D 23/04; C06D 23/00; C06D 47/14; C06D 29/02; C06D 33/02; C06D 29/22; C06D 7/00
USPC .................................................. 149/116, 117
See application file for complete search history.

(56) References Cited

U.S. PATENT DOCUMENTS 5,154,782 A * 10/1992 Shaw ...................... C06B 29/02
149/117
8,197,619 B1 * 6/2012 Nelson ..................... C06B 43/00
149/105
(Continued)

FOREIGN PATENT DOCUMENTS

WO WO-2018066312 A1 * 4/2018 ............. F41B 15/00

*Primary Examiner* — Stephen Johnson
(74) *Attorney, Agent, or Firm* — Ulysses John Biffoni

(57) ABSTRACT

A multispectral smoke obscurant composition effective in reducing transmittance in the visual, infrared, and ultraviolet regions of the electromagnetic spectrum, comprising at least one metal organic framework ("MOF"), at least one fuel, at least one oxidizer, and optionally one or more additives selected from the group consisting of binders, coolants, and accelerants. The MOF or MOF composite is present from about 10 to 90 weight percent of the smoke obscurant composition, while the fuel and the oxidizer in combination comprise about at least 10 weight percent of the smoke obscurant composition.

17 Claims, 6 Drawing Sheets

Metal oxide SBU: $Zr_xO_y$ $Zn_xO_y$ $Ti_xO_y$ $Cu_xO_y$ etc

Organic linker:

(51) Int. Cl.
    *C06B 29/22*     (2006.01)
    *C06B 29/02*     (2006.01)
    *C06B 23/04*     (2006.01)
    *C07F 1/08*     (2006.01)
    *F42B 12/48*     (2006.01)

(56) References Cited

U.S. PATENT DOCUMENTS

| | | | |
|---|---|---|---|
| 2012/0267016 A1* | 10/2012 | Lombardi | C06B 29/08 149/75 |
| 2018/0079695 A1* | 3/2018 | Reimer | C06B 23/00 |
| 2020/0147127 A1* | 5/2020 | Duncan | B01J 20/226 |

\* cited by examiner

FIG. 1

Metal oxide SBU: $Zr_xO_y$ $Zn_xO_y$ $Ti_xO_y$ $Cu_xO_y$ etc

Organic linker:

PYROTECHNIC SMOKE OBSCURANTS CONTAINING METAL-ORGANIC FRAMEWORKS AND COMPOSITES THEREOF

CROSS-REFERENCE TO RELATED APPLICATIONS

This patent application claims the benefit of priority of U.S. Provisional Patent Application Ser. No. 62/660,609, filed on Apr. 20, 2018, which is incorporated herein in its entirety.

GOVERNMENT INTEREST

The invention described herein may be manufactured, used and licensed by or for the United States Government.

FIELD OF THE INVENTION

The invention relates to the application of metal-organic frameworks ("MOFs") and composites thereof as pyrotechnically driven obscurants effective in the ultraviolet, visible and/or infrared region of the electromagnetic spectrum. The invention also includes the application of MOFs and/or MOF composite obscurants into a portable smoke generating device.

BACKGROUND OF THE INVENTION

Bispectral and trispectral (ultraviolet through visible and far infrared electromagnetic radiation) screening smokes are of increased interest to militaries due to the proliferation of ultraviolet sensors, thermal imaging, night vision, and other thermal guided threats. Multispectral screening smoke increases the warfighter's level of protection against emerging threats and methods of detection, while combining technologies to reduce logistical load. However, there is no known high efficiency bispectral obscurant smoke or continuously burning grenade. Ideally, the soldier would have a pyrotechnic device producing an obscurant that can provide a high performance bispectral and/or trispectral obscuration with continuous cloud production. Continuous cloud production is desirable to reduce transmittance and it is desirable to obtain obscurants that preferably block or reduce transmittance in the wavelengths between 40 nm to 100 μm (ultraviolet through visible to infrared).

Metal Organic Frameworks ("MOFs") are compounds that have metal ions coordinated to organic ligands. These coordination networks results in a stable porous structure usable for the storage of small molecules. MOFs possess appealing characteristics that have made them successful in applications such as gas purification and separation, catalysis, and sensors. However, to date no work has been done to explore the use of MOFs and MOF composites in obscurant chemistry. The structural components of MOFs are uniquely suited to smoke production. In particular, MOFs consist of a self-contained pyrotechnic mix, including a fuel (metal node) and oxidizer (ligand). MOFs and MOF/composites can replace, supplement, or enhance components of pyrotechnic smoke formulations in order to produce an ultraviolet through infrared blocking smoke.

MOFs are known for use as pyrotechnic materials. Blair et al. teaches MOFs including Ca, Sr, Ba, K, and Cs metal as fuels, and organic linkers as oxidizer, in "Metal-organic fireworks: MOFs as integrated structural scaffolds for pyrotechnic materials," Chem. Commun., 2015, 51, 12185. However, Blair, et. al. does not discuss or concern generating smoke that can obscure in the ultraviolet, visible, and infrared regions of the electromagnetic spectrum.

SUMMARY OF THE INVENTION

A multispectral smoke-based obscurant effective in reducing transmittance of electromagnetic radiation in the ultraviolet, visible, and/or infrared region of the electromagnetic spectrum, comprising at least one metal organic framework ("MOF"), at least one fuel, and at least one oxidizer, wherein said MOF is selected from the group consisting of UiO-type MOFs, MIL-type MOFs, HKUST-1, Cu-based MOFs, DMOFs, pillared MOFs, M-MOF-74, MOFs possessing terephthalic acid (TA) ligands, and mixtures thereof. For a full understanding of the present invention, reference should be made to the following detailed description read in conjunction with the accompanying drawings.

DETAILED DESCRIPTION OF THE EMBODIMENTS OF THE INVENTION

A multispectral smoke obscurant effective in reducing transmittance in the visual, infrared, and ultraviolet spectrum, comprising at least one metal organic framework ("MOF"), at least one fuel, at least one oxidizer, and optionally at least one additive selected from the group consisting of binders, coolants, and accelerants. The MOF is present from 10 to 90 wt. % of the smoke obscurant, while the fuel and the oxidizer in combination are present at about at least 10 wt. % of the smoke obscurant.

The MOFs are made up of two components-metal oxide clusters known as secondary building units ("SBUs"), and organic linkers that connect the SBUs to form porous, reticular structures.

Figure 1:
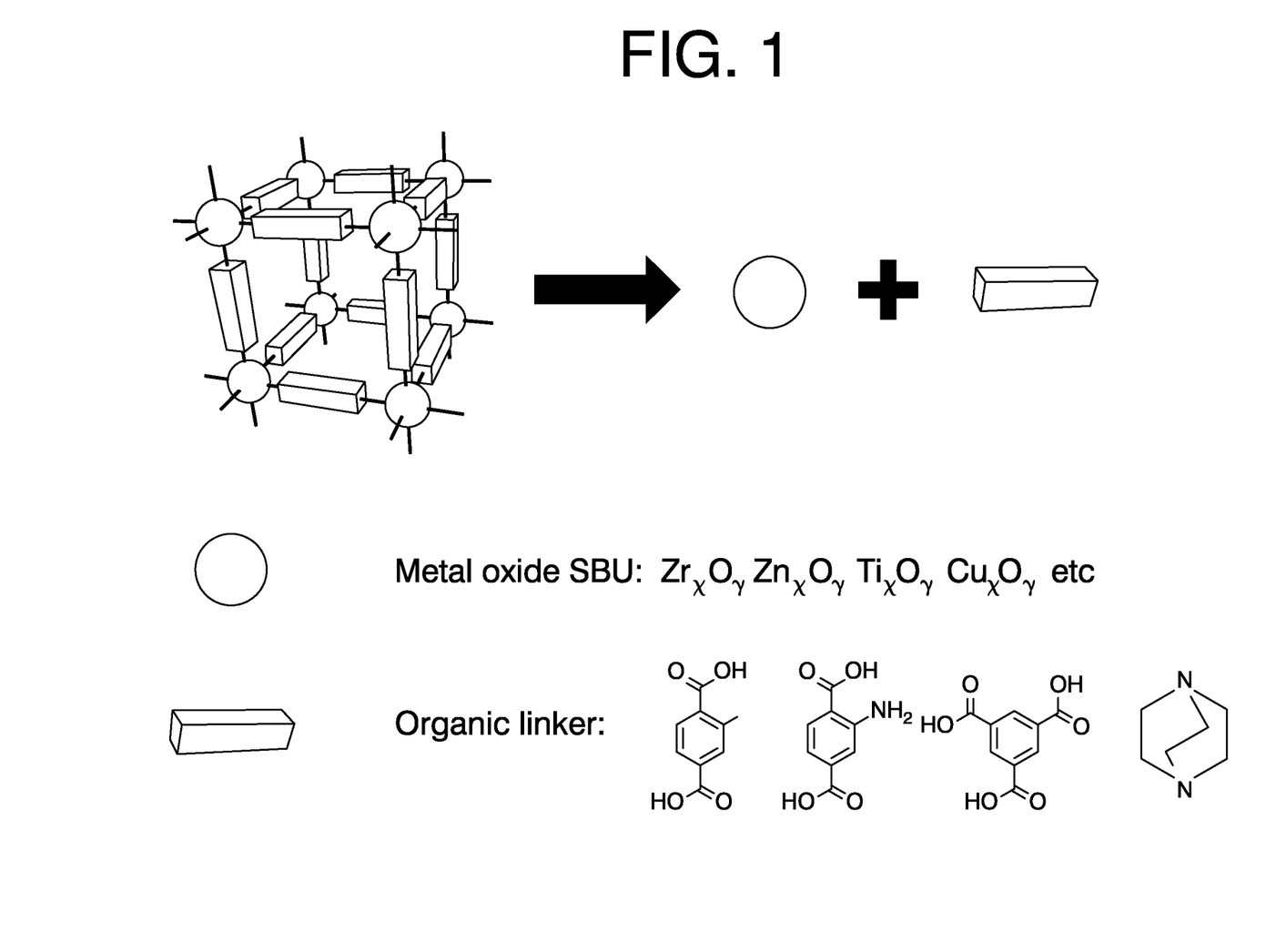
FIG. 1 depicts the structure of metal organic frameworks having metal oxide secondary building units (SBUs) and organic linkers.

A MOF of the present invention comprises a plurality of units, SBUs or metal-coordination-polyhedra, and ligands (linking moieties) as shown in FIG. 1. The ligands are polydentate to allow the formation of a one-, two-, or three-dimensional extended structure (e.g. terephthalic acid or imidazole). The SBUs of the present invention contain a cluster with formula $M_w O_x(OH)_y$ and bridged by carboxylates ($—CO_2$) originating from the dicarboxylic acid, forming a $M_w O_x(OH)_y (CO_2)_z$ cluster, wherein w=1-10, x=0-10, y=0-10 and z=4-20. M is a metal selected from the group consisting of Al, Sc, T, V, Cr, Mn, Fe, Co; Ni, Cu, Zn, Y, Zr, Nb; Mo, Tc, Ru, Rh, Pd, Ag, Cd, Lu, Hf, Ta, W, Re, Os, Ir, Pt, Au, Hg, Rf, Db, Sg, Bh, Hs, Mt, Ds, Rg, Lanthanides, Actinides, and Uub. Preferably; M is a transitional metal selected from the group consisting of Ti, Cr, Co, Ni, Cu, Zn, Zr, Pd, Cd, Hf and Rf. More preferably, M is a transitional metal selected from the group consisting of Ti, Co, Ni, Zn, Zr, Cd, Hf and Rf. Most preferably, M is a transitional metal selected from the group consisting of Ti, Zr, Hf and Rf, as the Group IV elements interact strongly with oxygen, and are therefore obvious choices for stable inorganic cornerstones in combination with oxygen-containing linkers.

Preferably, the transition metal useful for the present invention is zirconium, forming a zirconium-based MOF that is also known as UiO-66.

Figure 2A:
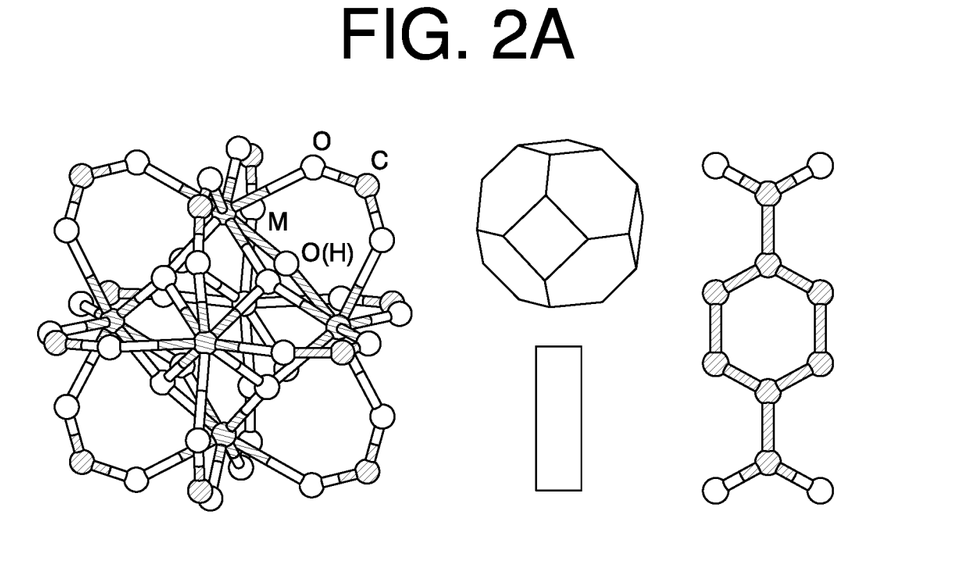
FIG. 2A depicts a UiO-66 MOF made up of zirconium hydroxide clusters with 1,4-benzodicarboxylic acid struts.
Figure 2B:
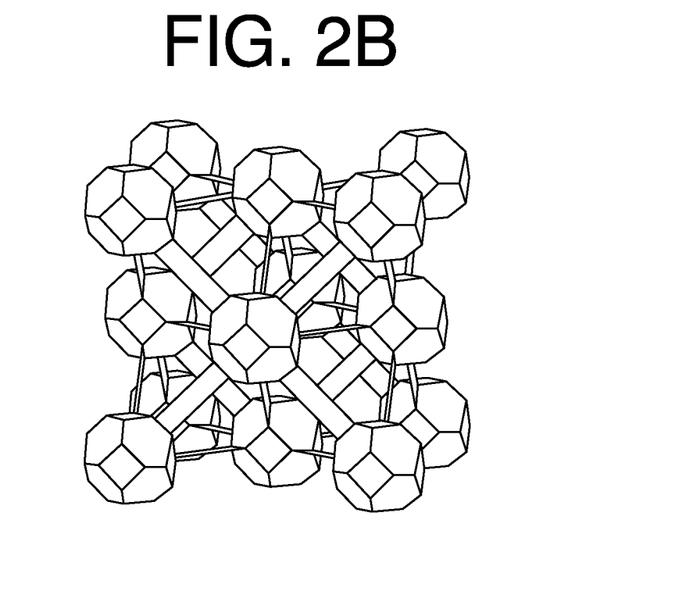
FIG. 2B depicts a UiO-66 having SBUs connected to a 12 bidendate terephthalic acid ligands.

FIG. 2 shows the structure of UiO-66, which comprises $[Zr_6O_4(OH)_4]$ clusters with 1,4-benzodicarboxylic acid struts, the secondary building unit (SBU) is connected to a 12 bidentate terephthalic acid ligand. UiO-66 possess a pore size of 6 Å which is conducive for the retention of a metal rod within the pore possessing the appropriate dimensions for an IR obscurant. In addition to this, preliminary studies conducted using UiO-66 as a replacement for TA in the smoke mix formulation provided successful white smoke production.

Alternatively, the organic linkers of the transition MOFs of the invention may be any linker molecule or molecule combination capable of binding to at least two inorganic cornerstones and comprising an organic moiety. Thus, the linker may be any of the linkers conventionally used in MOF production. These are generally compounds with at least two cornerstone binding groups; e.g. carboxylates, optionally with extra functional groups which do not bind the cornerstones but may bind other metal ions. The linkers moreover typically have rigidifying groups between the cornerstone-binding groups to facilitate 3D MOF formation. Examples of suitable organic linker compounds include oxalic acid, ethyloxalic acid, fumaric acid; 1,3,5-benzene tribenzoic acid (BTB), benzene tribiphenylcarboxylic acid (BBC), 5,15-bis (4-carboxyphenyl) zinc (II) porphyrin (BCPP), 1,4-benzene dicarboxylic acid (BDC), 2-amino-1,4-benzene dicarboxylic acid (R3-BDC or $H_2N$ BDC), 1,1-azo-diphenyl 4,4'-dicarboxylic acid, cyclobutyl-1,4-benzene dicarboxylic acid (R6-BDC), benzene tricarboxylic acid, 2,6-naphthalene dicarboxylic acid (NDC), 1,1'-biphenyl 4,4'-dicarboxylic acid (BPDC), 2,2'-bipyridyl-5,5'-dicarboxylic acid, adamantane tetracaboxylic acid (ATC), adamantane dibenzoic acid (ADB), adamantane teracarboxylic acid (ATC), dihydroxy-terephthalic acid (DHBDC), biphenyltetracarboxylic acid (BPTC), tetrahydropyrene 2,7-dicarboxylic acid (HPDC), hihydroxyterephthalic acid (DHBC), pyrene 2,7-dicarboxylic acid (PDC), pyrazine dicarboxylic acid, acetylene dicarboxylic acid (ADC), camphor dicarboxylic acid, fumaric acid, benzene tetracarboxylic acid, 1,4-bis(4-carboxyphenyl)butadiyne, nicotinic acid, and terphenyl dicarboxylic acid (TPDC). Other acids besides carboxylic acids, e.g. boronic acids may also be used. A mixture of linkers may be used to introduce functional groups within the pore space, e.g. by using aminobenzoic acid to provide free amine groups or by using a shorter linker such as oxalic acid. This introduction of functionalized linkers is facilitated since the transition MOFs have excess inorganic cornerstone coordination sites beyond those required to form the stable 3D MOF structure. The description of this MOF can be found in U.S. Pat. No. 9,474,997 to Peterson, which is incorporated herein by reference.

In addition to composite materials synthesized with UiO-66, other MOFs including NU-1000, Cu MOF 74, various other MOF and MOF composites are also effective. Useful MOFs are selected from the group consisting of UiO-type MOFs, other Zr-type MOFs, MIL-type MOFs, HKUST-1, Cu-based MOFs, DMOFs, pillared MOFs, M-MOF-74 (also known as DOBDC MOFs), MOFs possessing TA ligands. Preferably, useful MOF and MOF composites thereof are listed in Table 1.

TABLE 1

| Materials |
| --- |
| UiO-66 |
| UiO-66/Brass |
| NU-1000 |
| CuMOF 74 |
| $Cu(OAC)_2$ + NU-100 |
| $Cu(OAC)_2$ + Cu MOF 74 |
| Ag + UiO-66 |
| $Cu(OAc)_2$ + UiO-66 |

For the MOF composites UiO-66/Brass, $Cu(OAc)_2$+NU-1000, $Cu(OAc)_2$+Cu MOF 74, Ag+UiO-66, and Cu$(OAc)_2$+UiO-66, the weight ratio of the first component to the second component is about 1:3 to 3:1 relative to the total MOF weight.

Viewed from another aspect the invention provides a MOF having a metal atom to organic linker molecule ratio of from 1:0.45 to 1:0.55, especially 1:0.49 to 1:0.51, particularly 1:0.5, and preferably having a surface area of at least 50 $m^2/g$, etc. as above. Other preferred metal atom to organic linker molecule ratios are about 0.5:1, about 1:1, about 3:1 and about 1:3.

Useful fuels to be used in combination with the MOF or MOF composite are selected from the group consisting of aluminum, magnesium, magnalium, iron, steel, zirconium, titanium, ferrotitanium, ferrosilicon, manganese, zinc, sulfur, boron, copper, brass, tungsten, zirconium-nickel alloy, zirconium carbide, and mixtures thereof. Preferably, the useful fuel is selected from the group consisting of aluminum, titanium, magnesium, copper, and mixtures thereof. Fuel is present in the amount of about 2 to 70 wt. %, preferably about 6 to 50 wt. % of the smoke obscurant.

Useful oxidizers used in combination with the MOF or MOF composite are selected from the group consisting of potassium perchlorate, ammonium perchlorate, nitronium perchlorate, sodium nitrate, calcium nitrate, lithium perchlorate, ammonium nitrate, barium nitrate, strontium nitrate, caesium nitrate, strontium peroxide, lead dioxide, bismuth trioxide, iron (III) oxide, iron (II, III) oxide, manganese (IV) oxide, zinc oxide, chromium (III) oxide, tin (IV) oxide, barium sulfate, calcium sulfate, potassium sulfate, sodium sulfate, strontium sulfate, guanidine nitrate, hexanitroethane, cyclotrimethylene trinitramine, cyclotetramethylene tetranitramine, and, Teflon. Preferably, the useful oxidizer is selected from group consisting of potassium perchlorate, ammonium perchlorate, nitronium perchlorate, sodium nitrate, calcium nitrate, ammonium nitrate, barium nitrate, strontium nitrate, caesium nitrate, strontium peroxide, lead dioxide, bismuth trioxide, iron (III) oxide, iron (II, III) oxide, manganese (IV) oxide, chromium (III) oxide, tin (IV) oxide, and mixtures thereof. Oxidizer is present in the amount of about 2 to 50 wt. %, preferably about 4 to 30 wt. % of the smoke obscurant.

Alternatively, the multispectral smoke obscurant composition has a weight ratio of MOF or MOF composite to the combination of fuel and oxidizer from 1:9 to 9:1, preferably from 2:5 to 5:2.

The smoke obscurant may also contain at least one binder selected from the group consisting of nitrocellulose, polyacrylate elastomers (e.g. Hytemp®), acrylic resins (e.g. Hycar®), polyvinyl alcohols, unsaturated polyester resin (e.g. LAMINAC®), and other similar rubber compounds. The binder is present in the amount of 1 to 10 wt. % of the smoke obscurant.

The smoke obscurant may also contain at least one coolant to lower the burning temperature of the mixture, and/or slow down the reaction rate, selected from the group consisting of clay, diatomaceous earth, alumina, silica, magnesium oxide, carbonates, chloride salts, oxamide, strontium carbonate, and mixtures thereof. Coolant is present in the amount of about 2 to about 25 wt. %, preferably 4 to 20 wt. % of the multispectral smoke obscurant composition.

This MOF based multispectral smoke obscurant composition has application in many unconsolidated or pressed configurations. The multispectral smoke obscurant can provide a dense smoke cloud up to several minutes when it is pressed at a loading between about 2500 to about 5000 pounds per square inch into a single or multiple canister totaling approximately 2 to about 5 inches in diameter, and between about 7.5 to about 9.0 inches in height for use in an 81 mm or similar mortar payload configuration.

Alternatively, the multispectral smoke obscurant composition can be pressed at a loading pressure of between about 2500 to about 5000 pounds per square inch into a canister of smoke grenade size that is approximately 2.3 inches in diameter and between about 4.5 to about 6.0 inches in height. The total burn time for the grenade may be increased beyond 120 seconds by adding additional amounts of a coolant such as the carbonates or chlorides of suitable salts; i.e. ammonium, calcium, sodium, magnesium, and/or lithium.

When pressed into larger canisters suitable for use in a mortar or artillery shell, the composition is pressed at a suitable loading pressure that exceeds the setback force on the canister during the flight to the target area. The multispectral smoke obscurant has been shown to produce large quantities of smoke when pressed to pressures between about 5000 to about 7500 pounds per square inch into single or multiple canisters of smoke artillery size; totaling approximately 5 inches in diameter and about 18 to about 25 inches in height for use in a 155 mm projectile.

The current TA/PE M83 smoke grenades require the materials first be pressed into 5 slugs and then pressed into the grenade bodies in three increments, a process that requires additional tooling and time, as well as longer exposure to the smoke mix. The MOF based multispectral screening smoke can be pressed in three increments directly into the grenade body. This reduces the amount of press operations from 8 to 3 per grenade.

The smoke obscurant is effective in the visible, infrared, and/or ultraviolet range. Specifically, the smoke obscurant produces a specific color in the visible range, for example, yellow smoke is produced by UiO-66-NH2, NU-1000, Mg-MOF-74, and other yellow MOFs. Blue smoke is produced from HKUST-1 and other blue MOFs, etc.

Method of Production

MOF construction is effected in solution, typically an organic solvent, for example DMF, using a soluble precursor such as Zr compound and the organic linker and, preferably, in a molar ratio of from 0.6:1 to 3:1, particularly 0.8:1 to 2:1 especially about 1:1. The solution is generally heated, for example to 60 to 150° C., preferably 100 to 140° C., especially 110 to 130° C., particularly 115 to 125° C. (e.g. 80 to 130° C. or 100 to 120° C.). The MOF formation is preferably allowed to occur under static conditions, e.g. for up to 96 hours, especially 12 to 72 hours, particularly 24 to 48 hours, (e.g. for 10 to 30 hours, especially 15 to 19 hours). The use of too long a formation period, e.g. 7 days, or too high a formation temperature (e.g. at or above the upper limits mentioned above) is generally undesirable as the surface area of the resulting MOF tends to be reduced. Alternatively, no solvent is necessary for constructing the MOF, and the general conditions such as heating, and the growth period can be modified accordingly. The metal is preferably present in the reaction solution at a concentration of 0.3-2.0 M, especially 0.5-1.0 M, particularly 0.6-0.8 M. The reaction is preferably effected under an oxygen-free atmosphere and using water-free solvents. The resulting MOF should then be washed with solvent (conveniently the one used for the MOF formation reaction) and thoroughly dried. The surface area can be determined by use of nitrogen adsorption and the BET method. This method, by which the surface areas referred to herein may be determined, is described by Rouquerol et al in "Adsorption by powders and porous solids", Academic Press, San Diego, Calif., USA, 1999.

The solvent used is conveniently an alcohol, dimethyl formamide (DMF), toluene, methylethyl ketone (MEK), dimethylsulfoxide (DMSO), tetrahydrofuran (THF), cyclohexanone, diethyl formamide (DEF), N-methyl pyrridone, acetone, an alkane, pyridine or acetonitrile. The use of DMF is especially preferred.

The metal salt used is preferably a halide (e.g. the chloride), an alcoholate, a nitrate, or an acetonate. The metal may, if desired, be present in such a reagent as an oxide cation.

The synthesis of NU-1000, a highly robust mesoporous (containing pores >2 nm) metal-organic framework (MOF), can be conducted efficiently on a multigram scale from inexpensive starting materials. Tetrabromopyrene and (4-(ethoxycarbonyl)phenyl) boronic acid can easily be coupled to prepare the requisite organic strut with four metal-binding sites in the form of four carboxylic acids, while zirconyl chloride octahydrate is used as a precursor for the well-defined metal oxide clusters. Detail of the synthesis of NU-1000 can be found in Wang, et al. *Scalable synthesis and post-modification of a mesoporous metal-organic framework called NU-1000*. Nature Protocols. Vol. 11, No. 1. 2016.

For various MOFs containing copper (Cu) such as Cu(OAc)2+NU-1000, Cu(OAc)2+Cu MOF 74, and Cu(OAc)2+UiO-66, a common procedure was used. Briefly, a 0.02 M ethanol/copper acetate solution was prepared, and the MOF was added to the solution, such that copper (Cu) was grown in the pores of the MOF by using copper acetate as a precursor to grow copper oxide, followed by reduction to Cu with $NaBH_4$ in a nitrogen atmosphere. The resulting materials were then centrifuged and transferred to evaporating dish to dry in oven. Details of the synthesis of the copper composite MOF can be found in Wang, et. al. Cu(II)/Cu(0)@UiO-66-NH2: base metal@MOFs as heterogeneous catalysts for olefin oxidation and reduction. Chem. Commun., 2016, 52, 13116-13119.

Silver was grown in the pores of an UiO-66 MOF using a polyol synthesis in which silver nitrate was reduced to Ag in a dimethylformamaide ("DMF") and polyvinylpyrrolidone ("PVP") solution that was refluxed at 160° C. for 2 h. Detail of the synthesis of Ag/UiO66 MOF can be found in Liu, et. al. *Fabrication of Ag/TiO2 nanoheterostructures* with visible light photocatalytic function via a solvothermal approach, CrystEngComm 14(11) (2012) 3989-3999.

EXAMPLE

Subscale Grenade Preparation

Subscale grenades were prepared using 10 g samples of pyrotechnically driven mixtures of each material of interest that were listed in Table 1. Mixes were wet blended in acetone by hand in small batches to ensure homogeneous mixing. All mixes were dried for a minimum of one hour in a friction air oven at 165° F. Samples were then pressed into subscale grenade bodies having an inner diameter of 1.136" and a height of 2.221". Ten grams of each mix with 0.5 g of first fire starter were pressed into the subscale grenade can using a Carver press at 2000 lbs dead load. Samples were ignited using Visco cannon fuse in the pyrotechnic smoke box and video was recorded for each trial. Two sets of each sample mixture were prepared, one for testing in the pyrotechnic smoke box, and one for testing in the aerosol chamber.

Aerosol Chamber Testing

All materials were disseminated in a cylindrical chamber with a volume of 190 m³ (6 m diameter, 6.8 m height). The chamber is equipped with a stirring fan to provide a homogeneous mixture throughout the volume. Transmission measurements in the visible region (0.3 to 0.9 μm) were achieved with a Mikropack UV/visible source (Model DH 2000-BAL) and an Ocean Optics UV/visible spectrometer (Model HR2000CG-UV-NIR). Transmission in the infrared region (0.9 to 2.5 μm and 2.5 to 20 μm) was determined using two Jasco FTIR spectrometers (Model FT/IR-6100). A path length of 6 meters was used in all calculations for extinction since the sources and detectors for the spectrometers were on opposite sides of the 6-meter diameter chamber. The spectrometers were placed at a height of 3.4 meters. The concentration of material within the chamber was determined by taking an aliquot of air from the chamber. This was done by drawing a vacuum from the chamber onto a filter for 30 seconds to obtain a yield factor and 120 seconds for concentration measurements. The volume of air passed through the filter was measured using an Omega Engineering flow meter (Model FMA-1618A). The mass accumulated on the filter was weighed using a Mettler Toledo balance (Model MX5). Inside the chamber, a mixing fan was operated at 97 rpm throughout the test. Using a 672 nm laser diode (Newport, Mountain View, Calif.) throughout the test, laser transmission was observed. After the material is disseminated, the laser transmission has a decaying oscillation and will reach a steady state, and then homogeneity is presumed. At this time, spectrometers and filter measurements are started. The software Agilent VEE was used to control and capture the data from the flow meter and laser diode instruments. All the data gathered from the various instruments were then processed with the software Mathworks Matlab.

The yield from the aerosol test was calculated from filters that were removed from the chamber after dissemination. Yield is calculated as the mass of the airborne material divided by the initial mass of material. Table 2 gives the calculated yield for each test sample. The objective is to eject as much material as possible in the cloud which will increase the concentration and in turn increase the obscurance. For reference, most pyrotechnic generated smoke has a yield of 40-50%. In this situation even, the sample containing TA which is under its ideal conditions producing a yield lower than expected, likely due to the small size of the test samples. However, despite the low values it promising to see that material is being ejected into the cloud upon dissemination and future work will strive to create a mixture that is ideal for each material.

TABLE 2

Aerosol Testing

| Material | Percent Composition | Yield (%) |
|---|---|---|
| TA | 100 | 26.5 |
| Brass | 100 | 8.6 |
| TA/Brass | 25/75 | 7.5 |
| TA/Brass | 50/50 | 7.4 |
| TA/Brass | 75/25 | 11.5 |
| UiO-66 | 100 | 3.5 |
| Brass | 100 | 8.6 |
| UiO-66/Brass | 25/75 | 7.6 |
| UiO-66/Brass | 50/50 | 5.0 |
| UiO-66/Brass | 75/25 | 3.0 |

UV/Vis Spectroscopy Results

The materials of interest were dispersed in a non-polar solvent, toluene or cyclohexane, that allowed for homogenous dispersion. Both toluene and cyclohexane were also chosen due to their limited interaction into the infrared region. The concentration of each solution remained constant at 0.2 mg/mL. Once dispersed in solution each vial was mechanically sonicated for 15-30 min to ensure homogeneity. Samples were then immediately analyzed post sonication by UV/Vis spectroscopy on a Jasco V-670 spectrometer to measure extinction.

Extinction coefficients were calculated as a means of quantifying obscuration potential by utilizing UV-Vis spectroscopy. Extinction coefficient contributes to the value of transmittance as shown in equation (1), wherein $\alpha$ is the extinction coefficient, c is the concentration, and l is the path length. Extinction coefficients were calculated from the equation (2)-(4). In these equations, Beer's Laws, $\alpha$, extinction coefficient, is calculated as a function of T, Transmittance, through l, path length, at a given c, concentration.

$$T = e^{-\alpha CL} \quad (1)$$

$$\text{Abs} = \alpha cl \quad (2)$$

$$T = 10^{-\text{Abs}} \quad (3)$$

$$\alpha = -\ln(T)/cl \quad (4)$$

Figure 3:
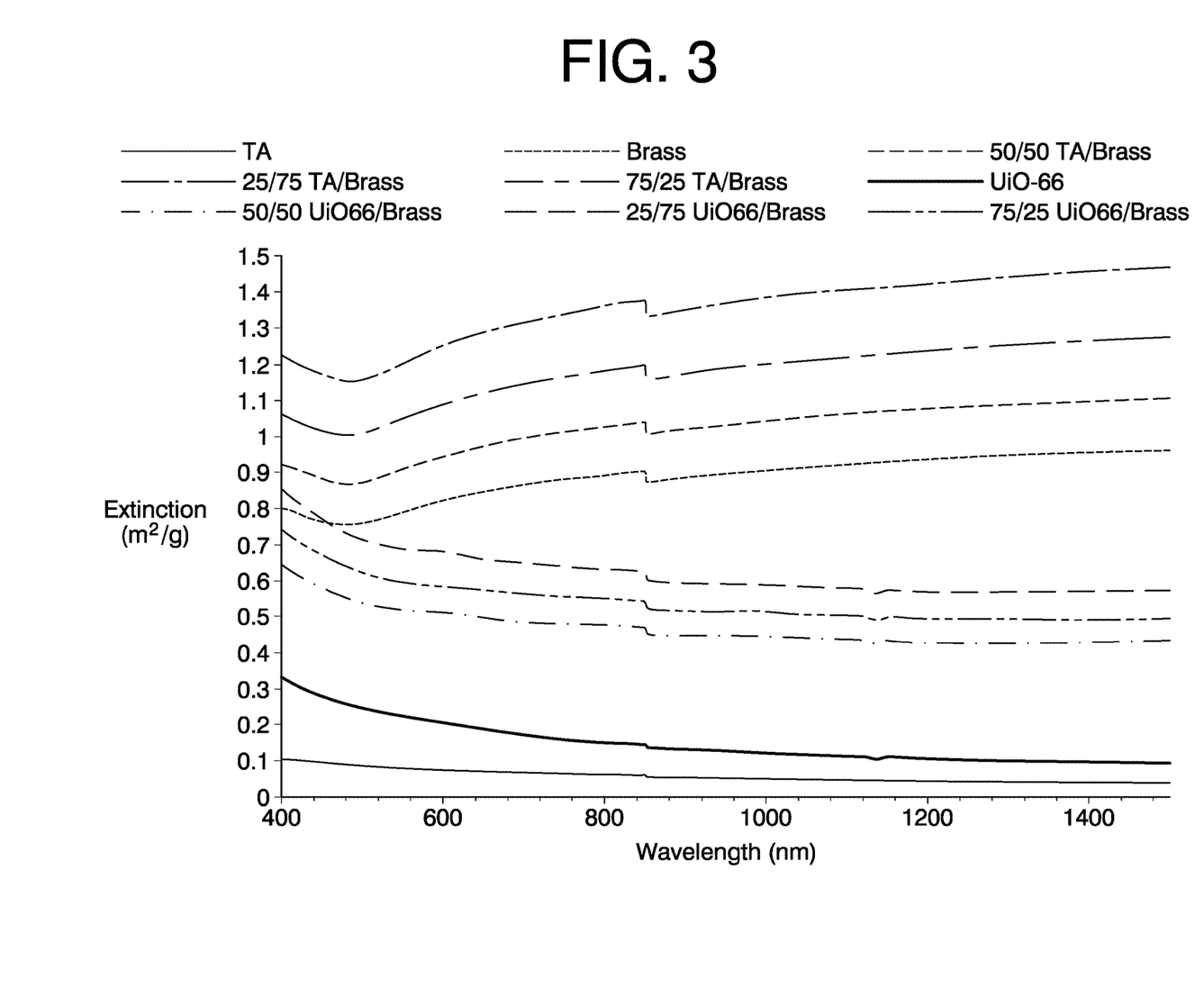
FIG. 3 graphically shows extinction at various wavelengths for various obscurant materials in toluene as solvent. Various materials and mixture ratios were examined.

For FIG. 3, extinction was plotted versus wavelength for each material and mixture ratio that was examined. In toluene as solvent, the 25/75 TA/Brass mixture showed the highest extinction over the entire range of wavelengths tested. In toluene, TA had the lowest values for extinction, followed by UiO-66.

Figure 4:
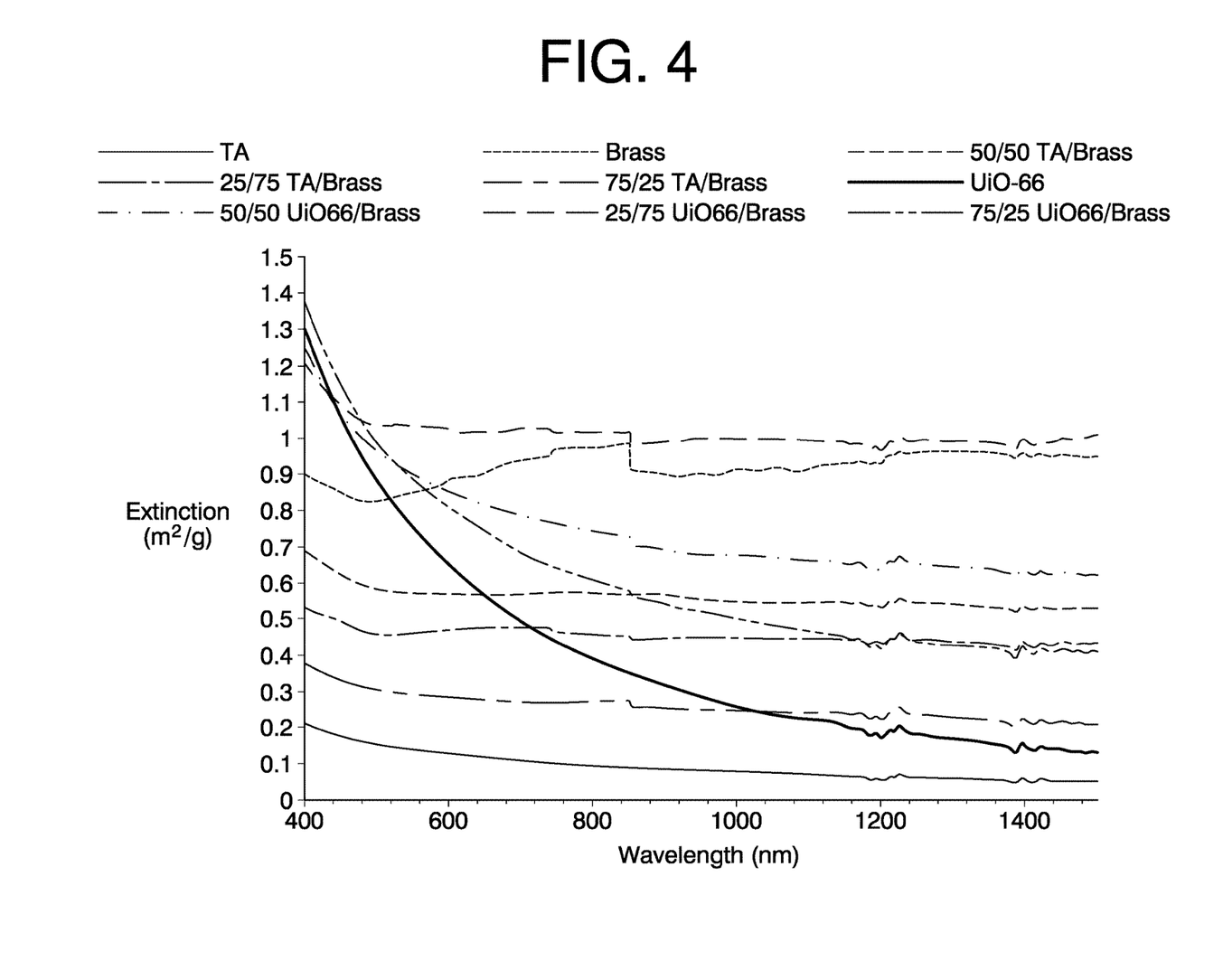
FIG. 4 graphically shows extinction at various wavelengths for various obscurant materials in cyclohexane as solvent. Various materials and mixture ratios were examined.

For FIG. 4, the extinction was calculated and plotted versus wavelength for all samples in cyclohexane as solvent. The 25/75 UiO-66/brass mix ratio possessed the highest values for extinction, followed by brass alone. Again, TA showed the lowest values for extinction.

Figure 5:
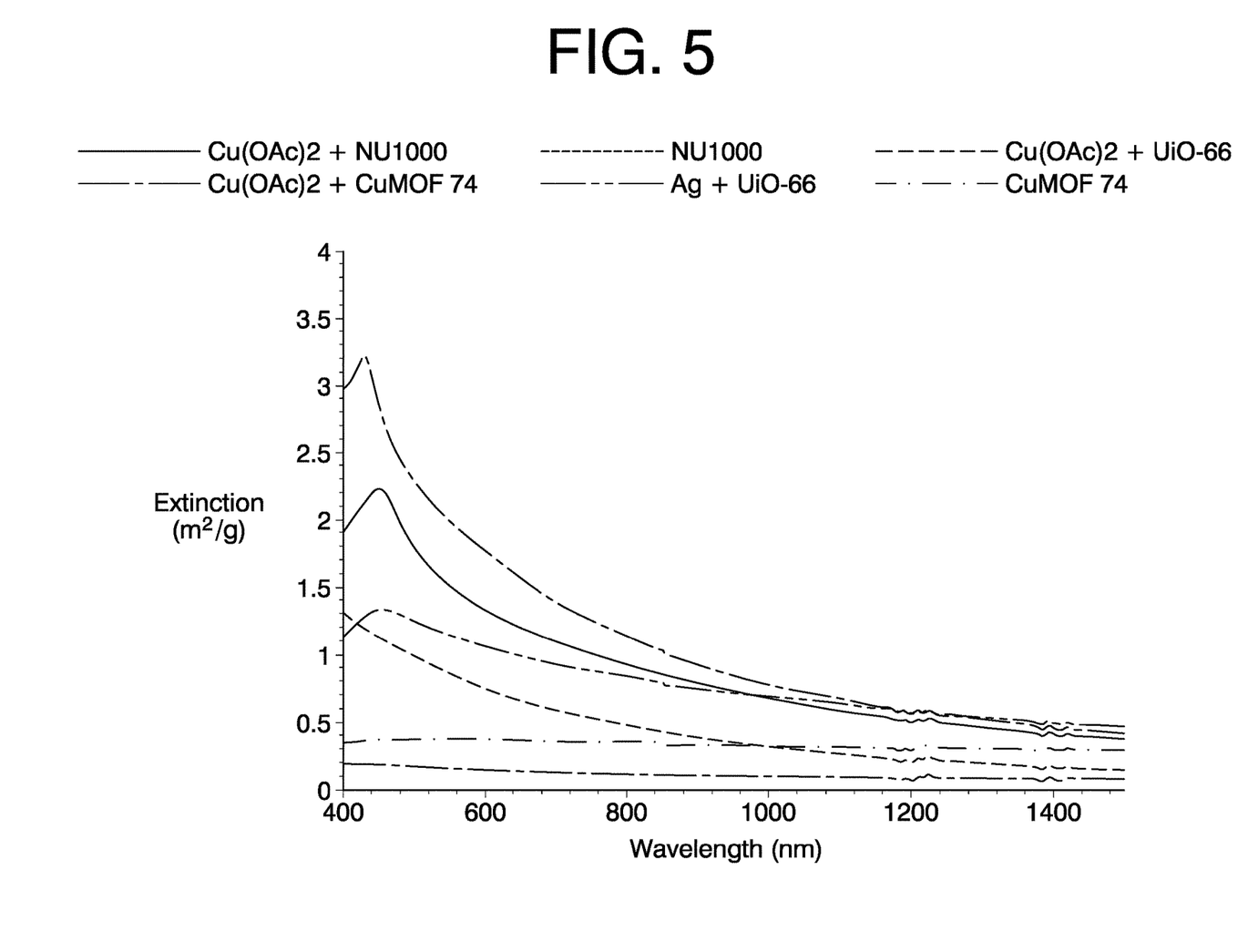
FIG. 5 graphically shows extinction at various wavelengths for various MOF and MOF composite obscurant materials in cyclohexane as solvent.

For FIG. 5, the same set of experiments were repeated for the synthesized composite MOF samples under the same conditions aforementioned in cyclohexane. The extinction was calculated and plotted versus wavelength to compare all composite samples. Samples of NU-1000 showed a very high extinction in the shorter wavelengths, declining sharply and flattening out after 1200 nm. The high extinction around 410 nm was expected for this sample due to its yellow color as a solid. NU-1000 synthesized with reduced copper showed a similar trend but maintained a little more consistency into the near infrared region. UiO-66 containing silver produced a relatively consistent value of extinction over the wavelengths measured. Samples of Cu MOF 74 had the lowest extinction values.

Figure 6:
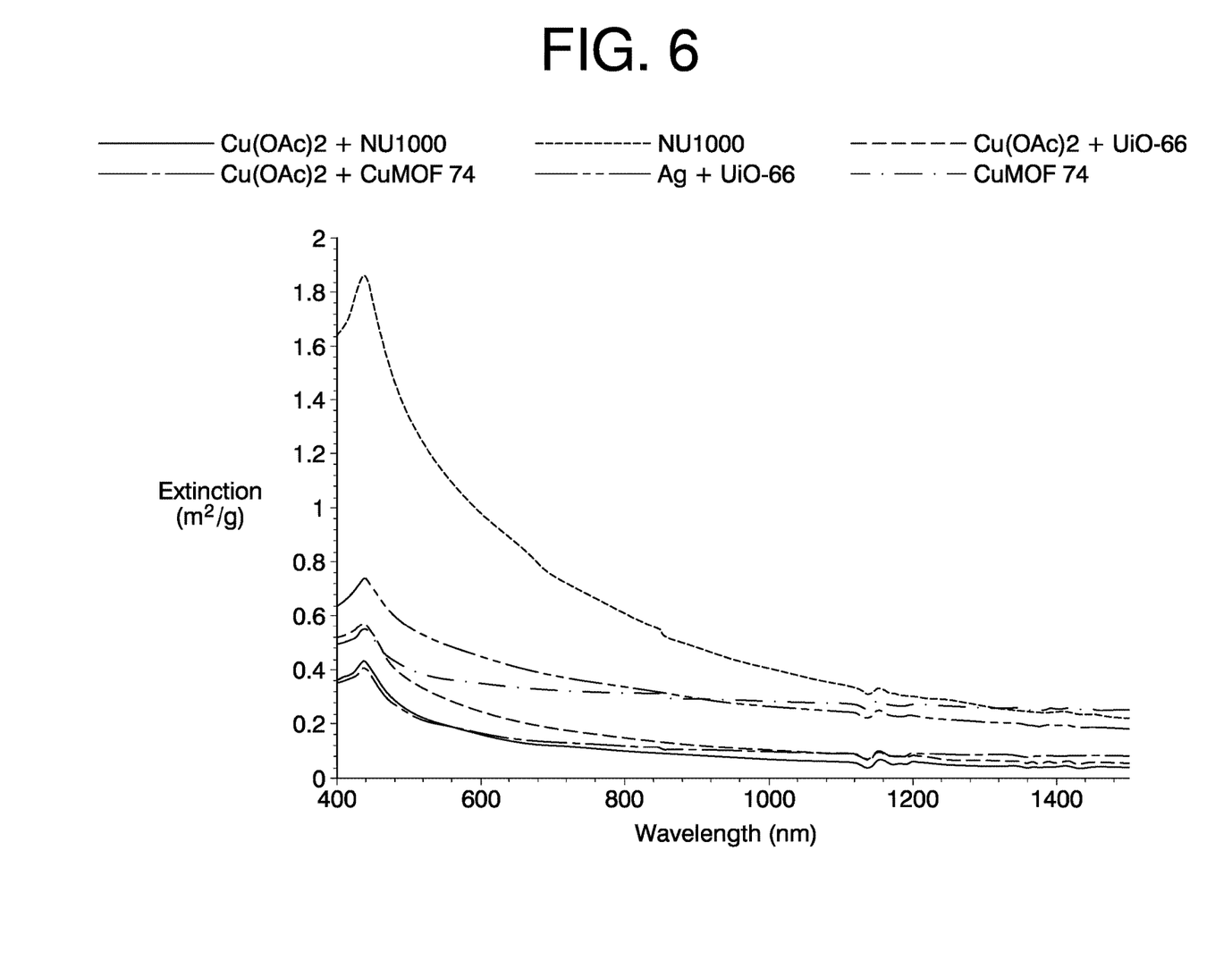
FIG. 6 graphically shows extinction at various wavelengths for various MOF and MOF composite obscurant materials in toluene as solvent.

For FIG. 6, all samples were analyzed under the same conditions but in a toluene solution for comparison. Values of extinction for the composite materials became significantly lower when the solvent was changed. However, the shape of the curves as well as the "best" performing materials remained the same. Both NU-1000 and UiO-66 possessing Ag remained the highest extinction in the visible. In this experiment the sample containing CuMOF74 showed a more consistent trend over the wavelengths being measured.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention as defined in the claims.

The invention claimed is:

1. A multispectral smoke obscurant composition, comprising: at least one metal organic framework ("MOF") or MOF composite, at least one fuel, and at least one oxidizer, wherein said MOF or MOF composite is selected from the group consisting of UiO-type MOFs, MIL-type MOFs, HKUST-1, Cu-based MOFs, DMOFs, pillared MOFs, M-MOF-74, MOFs possessing TA ligands, UiO-66, UiO-66 in combination with Brass, NU-1000, Cu MOF 74, Cu(OAc)$_2$ in combination with NU-1000, Cu(OAc)$_2$ in combination with Cu MOF 74, UiO-66 in combination with Ag, and Cu(OAc)$_2$ in combination with UiO-66 and mixtures thereof, and wherein said smoke obscurant is effective in reducing transmittance in the ultra violet, visible, and infrared spectrum when pyrotechnically disseminated.

2. The multispectral smoke obscurant of claim 1, wherein said MOF having two components has a weight ratio of a first component to a second component from 1:3 to 3:1.

3. The multispectral smoke obscurant of claim 1, wherein said at least one fuel is selected from the group consisting of aluminum, magnesium, magnalium, iron, steel, zirconium, titanium, ferrotitanium, ferrosilicon, manganese, zinc, copper, brass, tungsten, zirconium-nickel alloy, zirconium carbide, sulfur, boron, and mixtures thereof.

4. The multispectral smoke obscurant of claim 3, wherein said at least one fuel is selected from the group consisting of aluminum, titanium, magnesium, copper, and mixtures thereof.

5. The multispectral smoke obscurant of claim 1, wherein said at least one fuel is present in the amount of about 6 to 50 wt. % of said multispectral smoke obscurant.

6. The multispectral smoke obscurant of claim 1, wherein said at least one oxidizer is selected from group consisting of potassium perchlorate, ammonium perchlorate, nitronium perchlorate, sodium nitrate, calcium nitrate, lithium perchlorate, ammonium nitrate, barium nitrate, strontium nitrate, caesium nitrate, strontium peroxide, lead dioxide, bismuth trioxide, iron (III) oxide, iron (II, III) oxide, manganese (IV) oxide, chromium (III) oxide, tin (IV) oxide, zinc oxide, and mixtures thereof.

7. The multispectral smoke obscurant of claim 1, wherein said at least one oxidizer is present in the amount of about 4 to 30 wt. % of said multispectral smoke obscurant.

8. The multispectral smoke obscurant of claim 1, wherein said multispectral smoke obscurant further includes at least one coolant selected from the group consisting of clay, diatomaceous earth, alumina, silica, magnesium oxide, carbonates, chloride salts, oxamide, strontium carbonate, and mixtures thereof.

9. The multispectral smoke obscurant of claim 8, wherein said coolant is present in the amount of about 4 to 20 wt. % of said multispectral smoke obscurant composition.

10. The multispectral smoke obscurant of claim 1, wherein said multispectral smoke obscurant further includes at least one binder selected from the group consisting of nitrocellulose, polyacrylate elastomers, acrylic resins, polyvinyl alcohols, and unsaturated polyester resin.

11. The multispectral smoke obscurant of claim 10, wherein said binder is present in the amount of about 1 to 10 wt. % of said smoke obscurant.

12. The multispectral smoke obscurant of claim 1, wherein said multispectral smoke obscurant is effective at screening in the visible, infrared, and/or ultraviolet range.

13. The multispectral smoke obscurant of claim 1, wherein said multispectral smoke obscurant composition has a weight ratio of the MOF to the combination of fuel and the oxidizer from 1:9 to 9:1.

14. The multispectral smoke obscurant of claim 13, wherein said multispectral smoke obscurant composition has a weight ratio of the MOF to the combination of fuel and the oxidizer preferably from 2:5 to 5:2.

15. The multispectral smoke obscurant of claim 1, wherein said multispectral smoke obscurant composition is pressed into a canister for a mortar payload at about 2,500 to 5,000 pounds per square inch.

16. The multispectral smoke obscurant of claim 1, wherein said multispectral smoke obscurant composition is pressed into a canister for a grenade at about 2,500 to 5,000 pounds per square inch.

17. The multispectral smoke obscurant of claim 1, wherein said multispectral smoke obscurant composition is pressed into a canister for an artillery payload at about 5,000 to 7,500 pounds per square inch.

* * * * *